United States Patent
Chen

(10) Patent No.: US 8,564,874 B2
(45) Date of Patent: Oct. 22, 2013

(54) TRANSMISSION MODE SWITCHING DEVICE AND 2D/3D SWITCHABLE DISPLAY APPARATUS

(75) Inventor: Chaoping Chen, KunShan (CN)

(73) Assignee: Infovision Optoelectronics (Kunshan) Co., Ltd., Kushan (CN)

( * ) Notice: Subject to any disclaimer, the term of this patent is extended or adjusted under 35 U.S.C. 154(b) by 133 days.

(21) Appl. No.: 13/181,841

(22) Filed: Jul. 13, 2011

(65) Prior Publication Data
US 2012/0250141 A1    Oct. 4, 2012

(30) Foreign Application Priority Data

Mar. 30, 2011  (CN) .......................... 2011 1 0080815

(51) Int. Cl.
*G02F 1/00* (2006.01)
*G02B 26/00* (2006.01)

(52) U.S. Cl.
USPC ........... 359/320; 359/296; 359/245; 359/228; 359/453; 345/107

(58) Field of Classification Search
USPC ........... 359/15, 228, 245, 296, 315, 316, 318, 359/320, 453; 345/84–87, 104, 105, 107, 345/211; 349/15, 57, 141, 186, 191, 200, 349/201
See application file for complete search history.

(56) References Cited

U.S. PATENT DOCUMENTS

| | | | |
|---|---|---|---|
| 6,943,947 B2* | 9/2005 | Adachi et al. | 359/453 |
| 7,072,086 B2* | 7/2006 | Batchko | 359/15 |
| 7,173,760 B2* | 2/2007 | Adachi et al. | 359/453 |
| 7,218,429 B2* | 5/2007 | Batchko | 359/15 |
| 7,750,981 B2* | 7/2010 | Shestak et al. | 349/15 |
| 8,179,425 B2* | 5/2012 | Harrold et al. | 348/51 |
| 2003/0048522 A1 | 3/2003 | Liang et al. | |

FOREIGN PATENT DOCUMENTS

CN   101118361   2/2008

* cited by examiner

*Primary Examiner* — Loha Ben
(74) *Attorney, Agent, or Firm* — Calfee, Halter & Griswold LLP

(57) ABSTRACT

The present invention discloses a transmission mode switching device and a 2D/3D switchable display apparatus. The transmission mode switching device comprises a first substrate on which a first transparent electrode is configured, a second substrate on which a second transparent electrode is configured, and a transmission mode switching layer located between the first and second substrates and formed by materials with isotropic optical properties. The transmission mode switching layer is switched between a first transmission mode in which the direction of light propagation is not altered and a second transmission mode in which the direction of light propagation is altered in response to switching of the electric field applied between the first and second transparent electrodes. The transmission mode switching device of the present invention is suitable for multiple modes, with low power consumption.

19 Claims, 6 Drawing Sheets

TRANSMISSION MODE SWITCHING DEVICE AND 2D/3D SWITCHABLE DISPLAY APPARATUS

CROSS-REFERENCE TO RELATED APPLICATION

This application claims priority of and incorporates by reference Chinese Patent Application No. 201110080815.1 filed Mar. 30, 2011.

FIELD OF THE INVENTION

The present invention relates to field of display, and more particularly, to a transmission mode switching device and a 2D/3D switchable display apparatus having the transmission mode switching device.

BACKGROUND

With continuous development of display technologies, people desire more and more for more realistic images. Recently, there have been three-dimensional (3D) display (also referred to as stereoscopic display) realized by using various techniques, which brings viewers more realistic stereoscopic effect compared to 2D display, and therefore is favorable and preferred.

The reason why the objects are three-dimensional from the view of people is that people have two eyes with a certain distance therebetween, and a 3D image is merged by the brain from two slightly different images of objects generated on the retina of two eyes. Stereoscopic display technology utilizes the rationale of stereoscopic imaging for human eyes, i.e., there are two slightly different images of objects viewed from different viewing angles by human eyes, and the two slightly different images are then merged by the brain to a stereoscopic vision. Currently, a common stereoscopic display method is the method adopting polarizers, which utilizes different polarization angles of light, to allow the lights in different polarization states to pass through the two polarizers respectively, and to project the two images with slight differences into left and right eyes, respectively, so as to bring three-dimensional stereoscopic perception to human. However, such stereoscopic display method is required for viewers to wear matching stereoscopic polarizing glasses to view 3D image, which often results in discomfort to viewers, especially to viewers already wearing a pair of glasses which are more difficult. Therefore, there are methods to view stereoscopic images without wearing stereoscopic glasses, i.e., methods for stereoscopic display with naked eyes, to satisfy the requirements of viewers.

FIGS. 1a and 1b disclose a partially sectional view of a conventional 2D/3D switchable display apparatus. As shown in FIGS. 1a and 1b, the 2D/3D switchable display apparatus includes a liquid crystal display panel 2 and a liquid crystal lens 3 provided at one side of the liquid crystal display panel 2 adjacent to the viewer. The liquid crystal display panel 2 has first pixels 21 (pixels filled by black in FIGS. 1a and 1b) and second pixels 22 (pixels unfilled in FIGS. 1a and 1b). The liquid crystal lens 3 includes a first substrate 31 adjacent to the viewer, a second substrate 32 far from the viewer, and a medium layer 33 interposed between the first substrate 31 and the second substrate 32. A first transparent electrode 311 is provided on one side of the first substrate 31 adjacent to the second substrate 32, and a second transparent electrode 321 is provided on one side of the second substrate 32 adjacent to the first substrate 31, the first transparent electrode 311 and the second transparent electrode 321 generally both being formed by indium tin oxide (ITO). There are a plurality of elongated arch-shaped spaces 34 at one side of the medium layer 33 adjacent to the second substrate 32, and liquid crystal 36 having anisotropic optical properties is filled in the arch-shaped space 34, and the refractive index $n_1$ of the medium layer 33 and the refractive index $n_e$ of major axis of the liquid crystal 36 as well as the refractive index $n_o$ of minor axis satisfy the following:

$$n_1 = n_o < n_e.$$

The arch-shaped space 34 has a curved surface adjacent to the first substrate 31 and a flat surface adjacent to the second substrate 32, and the curved and flat surfaces on the arch-shaped space 34 are both provided with an alignment layer 35, and, the alignment direction of the alignment layers 35 is the same as the direction of transmission axis of a corresponding light emitting polarizer in the liquid crystal display panel 2, as shown in FIG. 1a, the alignment directions of the alignment layers 35 on respective surface inside the arch-shaped space 34 are perpendicular to the paper surface. The 2D/3D switchable display apparatus can realize the switching between 2D display and 3D display by altering the voltage between the first transparent electrode 311 and the second transparent electrode 321 located in the liquid crystal lens 3.

As shown in FIG. 1a, when there is no voltage applied between the first transparent electrode 311 and the second transparent electrode 321, the major axis of liquid crystal 36 inside the arch-shaped space 34 is aligned along the direction parallel to the alignment direction, i.e., aligned perpendicularly to the paper surface as shown in FIG. 1a, at this time, the refractive index of liquid crystal 36 is $n_e$, and because $n_e < n_1$, the liquid crystal lens 3 is in a refracting mode, and converges the light incident from the second substrate 32, and in this case, the light emitted from the first pixels 21 and the second pixels 22 in the liquid crystal display panel 2 selectively enters the right and left eyes of the viewer, respectively, along the different propagation paths. Images entering the right and left eyes of the viewer are also two images with optical parallax since the images that the first pixels 21 and the second pixels 22 display are two images with optical parallax, and are merged by the brain to form a stereoscopic vision, therefore presenting a 3D display mode.

As shown in FIG. 1b, when there is a certain voltage applied between the first transparent electrode 311 and the second transparent electrode 321, an electric field is formed between the first transparent electrode 311 and the second transparent electrode 321, the major axis of liquid crystal 36 inside the arch-shaped space 34 is aligned along the direction of the electric field, i.e., aligned perpendicularly to the first substrate 31 and second substrate 32 as shown in FIG. 1b, at this time, the refractive index of liquid crystal 36 is $n_o$, and because $no_o = n_1$, the liquid crystal lens 3 is in a non-refracting mode, and the light incident from the second substrate 32 will not be refracted through liquid crystal 36 and the medium layer 33, but remains its original direction of propagation, and in this case, the light emitted from the first pixels 21 and the second pixels 22 in the liquid crystal display panel 2 simultaneously enters the right and left eyes of the viewer after passing through the liquid crystal lens 3, and the same image displayed on the liquid crystal display panel 2 will be received by the right and left eyes, therefore presenting a 2D display mode.

However, The above liquid crystal lens 3 based display apparatus for the switching of 2D display and 3D display is based on the polarized light, and as a result, such display apparatus now is only suitable for liquid crystal display employing the polarizer, but not for display device using non-polarized light mode such as cathode ray tube display (CRT), plasma display panel (PDP) or organic light emitting diode display (OLED), etc. Moreover, because the liquid crystal 36 is anisotropic, which has a refractive index $n_e$ of the major axis varied depending on the direction of incident light, and the medium layer 33 is isotropic material, the liquid crystal lens 3 is largely direction-dependent. In addition, as the liquid crystal 36 is affected by anchoring force as a result of requirement for alignment layer 35, the liquid crystal lens 3 requires a larger driving voltage, resulting in higher power consumption of the liquid crystal lens 3.

SUMMARY

It is an object of the present invention to provide a transmission mode switching device and a 2D/3D switchable display apparatus having the transmission mode switching device, which is able to be suitable for multiple modes.

In order to achieve the above object, one aspect of the present invention is to provide a transmission mode switching device, comprising a first substrate on which a first transparent electrode is configured, a second substrate on which a second transparent electrode is configured, and a transmission mode switching layer located between the first substrate and the second substrate and formed by materials with isotropic optical properties. The transmission mode switching layer is switched between a first transmission mode and a second transmission mode in response to switching of the electric field applied between the first transparent electrode and the second transparent electrode. The light passes through the transmission mode switching layer and keeps its original direction of propagation when the transmission mode switching layer is operated in the first transmission mode; while the light passes through the transmission mode switching layer and alters its original direction of propagation when the transmission mode switching layer is operated in the second transmission mode.

Another aspect of the present invention is to provide a 2D/3D switchable display apparatus used for presenting 2D and 3D display modes to predetermined viewers, comprising a display device and the transmission mode switching device as describe above, said transmission mode switching device is located between said display device and said predetermined viewer. The transmission mode switching layer is operated in said first transmission mode when said display apparatus presents a 2D display mode; and said transmission mode switching layer is operated in said second transmission mode when said display apparatus presents a 3D display mode.

The transmission mode switching device of the present invention has the first transparent electrode and the second transparent electrode respectively provided on the first substrate and the second substrate, and the transmission mode switching layer having isotropic optical properties and formed between the first substrate and the second substrate, and the transmission mode switching layer can be switched between the first transmission mode in which the direction of light propagation is not altered and the second transmission mode in which the direction of light propagation is altered, in response to switching of the electric field applied between the first transparent electrode and the second transparent electrode, and therefore can be applied in switching of 2D and 3D display modes.

The transmission mode switching device of the present invention can substitute the conventional liquid crystal lens, to replace the liquid crystal layer having anisotropic optical properties with the transmission mode switching layer having isotropic optical properties, and therefore, relative to the conventional liquid crystal lens, as the transmission mode switching device of the present invention is polarization-independent, it is compatible with multiple display modes such as liquid crystal display, cathode ray tube display, plasma display and organic light emitting diode display, etc. Meanwhile, the transmission mode switching layer of the present invention does not employ liquid crystal material, and need no alignment layer, therefore, the transmission mode switching device of the present invention avoids the liquid crystal from being affected by anchoring force and has relatively low driving voltage. Moreover, the transmission mode switching layer in the transmission mode switching device of the present invention is formed using the materials having isotropic optical properties.

Other aspects and features of the present invention will become apparent with reference to the detailed description for the accompanying drawings. However it should be known that the accompanying drawings are designed only for the purpose of illustration, but not for limitation of the scope of the present invention which should be referred to the appended claims. It should be also understood that unless otherwise specified the accompanying drawings are not necessarily drawn to scale, but only try to conceptually explain the structures and flows described herein.

BRIEF DESCRIPTION OF THE DRAWINGS

The embodiments of the present invention will be described in detail with reference to the accompanying drawings below.

DETAILED DESCRIPTION OF THE EMBODIMENTS

Figure 1A:
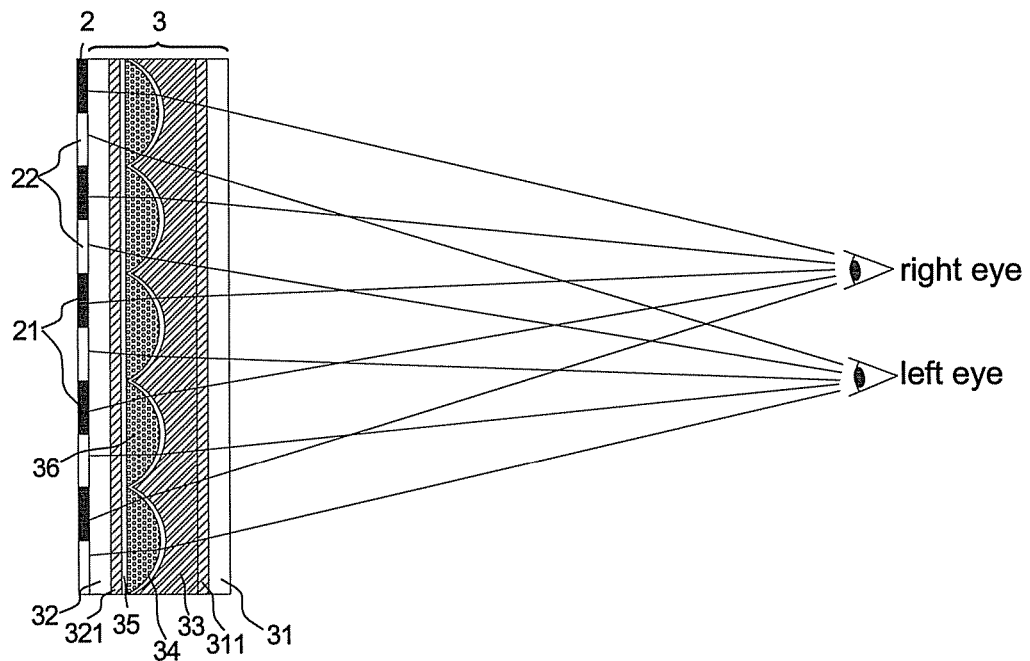
FIG. 1a is a partially sectional view of a conventional 2D/3D switchable display apparatus in a 3D display mode.

To make the above objects, features, and advantages of the present invention more apparent, the embodiments of the present invention will be described in detail in combination with the accompanying drawings.

In description for embodiments of the present invention, for convenience, the sectional views illustrating the structures are not enlarged in regular scale, and the schematic views are only exemplary, which should not limit the scope of the invention. Furthermore, the 3D spatial dimensions relative to length, width and depth should be included in actual manufacture.

In addition, it should be noted that for clarity and simplicity of the drawings, only structural features correlated to the inventive aspects of the present invention are shown in the drawings while other features are omitted.

The display apparatus of the present invention is used to present at least two display modes to the predetermined viewer, see FIGS. 2-7, which comprises a display device (not shown) and a transmission mode switching device 100, 200, 300. The transmission mode switching device 100, 200, 300 is located between the display device and the predetermined viewer. When the transmission mode switching device 100, 200, 300 is operated in a first transmission mode, the display apparatus presents a first display mode, e.g. 2D display mode. When the transmission mode switching device 100, 200, 300 is operated in a second transmission mode, the display apparatus presents a second display mode, e.g. 3D display mode. The display apparatus of the present invention is exemplified only by 2D/3D switchable display apparatus. The transmission mode switching device 100, 200, 300 of the present invention for switching of the modes is not based on the polarized light, and therefore, the display device of the present invention is not limited to the liquid crystal display device, but may also be cathode ray tube display device, plasma display device or organic light emitted diode display device, etc. The structures of the transmission mode switching device 100, 200, 300 of the present invention and its principle of operation are further described in detail hereinafter.

First Embodiment

Figure 2:
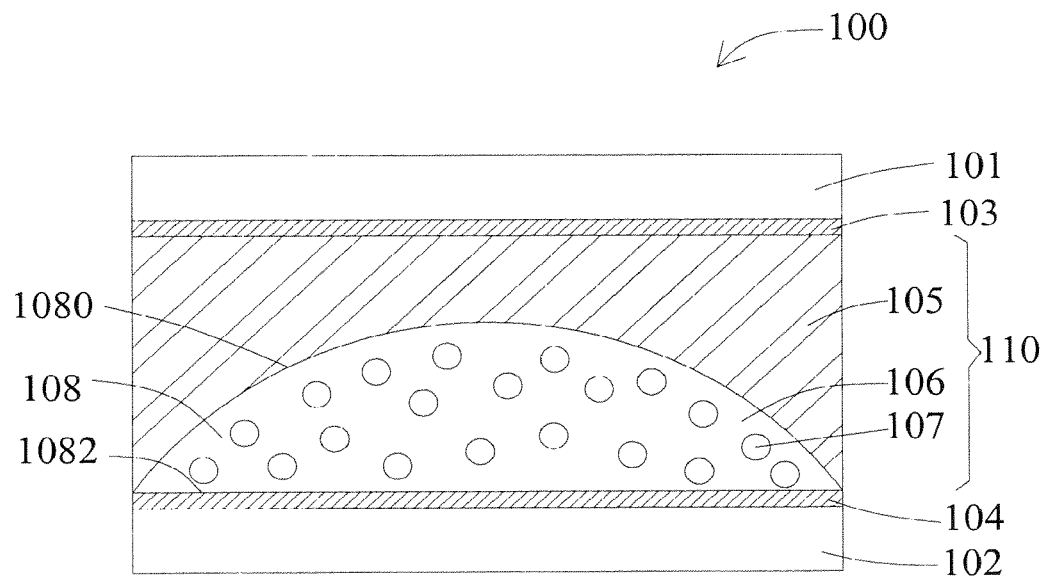
FIG. 2 is a partially sectional view of a transmission mode switching device according to a first embodiment of the present invention.

FIG. 2 discloses a partially sectional view of the transmission mode switching device 100 according to the first embodiment of the present invention. As shown in FIG. 2, the transmission mode switching device 100 of the present invention comprises a first substrate 101, a second substrate 102 and a transmission mode switching layer 110 located between the first substrate 101 and the second substrate 102. A first transparent electrode 103 is provided on the first substrate 101, and preferably, on one side of the first substrate 101 adjacent to the second substrate 102. A second transparent electrode 104 is provided on the second substrate 102, and preferably, on one side of the second substrate 102 adjacent to the first substrate 101. The first transparent electrode 103 and the second transparent electrode 104 are made of materials such as indium tin oxide (ITO), indium zinc oxide (IZO) or other transparent conductive materials. The transmission mode switching layer 110 is made of materials having isotropic optical properties.

The transmission mode switching layer 110 may switched between a first transmission mode and a second transmission mode in response to switching of the electric field applied between the first transparent electrode 103 and the second transparent electrode 104. In the first transmission mode, the transmission mode switching layer 110 essentially has optical properties of a flat lens or simply a plate of glass and exhibits a non-refracting mode, and therefore, the light passes through the transmission mode switching layer 110 and keeps its original direction of propagation without refraction when the transmission mode switching layer 110 is operated in the first transmission mode. In the second transmission mode, the transmission mode switching layer 110 essentially has optical properties of a condenser/plano-convex lens and exhibits a refracting mode, and therefore, the light passes through the transmission mode switching layer 110 and alters its original direction of propagation through refraction when the transmission mode switching layer 110 is operated in the second transmission mode.

Figure 1B:
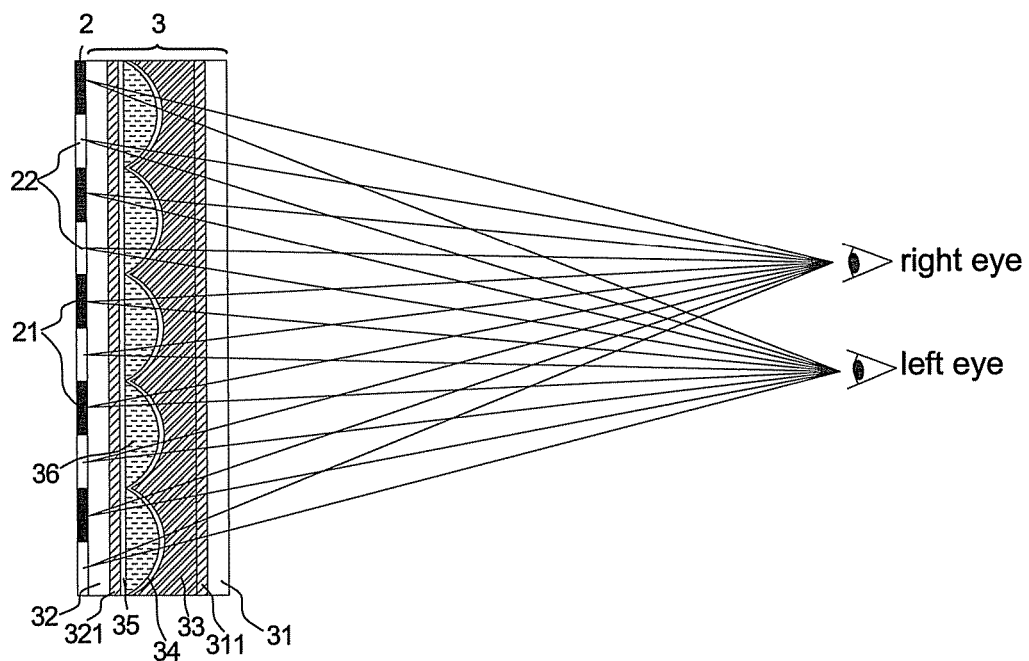
FIG. 1b is a partially sectional view of a conventional 2D/3D switchable display apparatus in a 2D display mode.

In this embodiment, the transmission mode switching layer 110 includes a solid medium layer 105 located between the first substrate 101 and the second substrate 102 and provided with a plurality of spaces 108 thereon, similar to the elongated archshaped spaces illustrated in FIGS. 1a and 1b, a fluid medium 106 filled in the plurality of spaces 108, and a plurality of transparent particles 107 dispersed within the fluid medium 106 in the plurality of spaces 108 and movable. Preferably, the solid medium layer 105 and the fluid medium 106 are both dielectric substance, and the transparent particles 107 are charged particles. The solid medium layer 105, the fluid medium 106 and the transparent particles 107 all have isotropic optical properties, and preferably, the refractive index $n_1$ of the solid medium layer 105 is essentially equal to the refractive index $n_2$ of the fluid medium 106, and the refractive index $n_1$ of the solid medium layer 105 is essentially less than the refractive index $n_3$ of the transparent particles 107, i.e., $$N_1 = n_2 < n_3.$$

For instance, the solid medium layer 105 can be made of organic polymers, such as polyethylene oxide (PEO) having a refractive index of about 1.45; the fluid medium 106 can be made of oils derived from hydrocarbons, such as carbon tetrachloride having a refractive index of about 1.46; and the charged transparent particles 107 can select titanium dioxide ($TiO_2$) particles having a refractive index of about 2.48.

The plurality of spaces 108 are all elongated, and the projections of the plurality of spaces 108 on the plane parallel to the first substrate 101 are adjacent to each other. Each space 108 has a curved surface 1080 and a flat surface 1082. The curved surface 1080 is an internal cylindrical surface, and the axis of the internal cylindrical surface of each space 108 is parallel to each other. The curved surface 1080 of each space 108 is configured opposed to the flat surface 1082.

In this embodiment, the first substrate 101 is provided adjacent to the viewer while the second substrate 102 is provided far from the viewer, and the curved surface 1080 is provided adjacent to the first substrate 101 while the flat surface 1082 is provided adjacent to the second substrate 102.

In this embodiment, the curved surface 1080 of each space 108 is joined with the flat surface 1082. Moreover, the first transparent electrode 103 and the second transparent electrode 104 corresponding to generate the electric field to each space 108 are both continuously provided as a whole sheet.

The plurality of transparent particles 107 are adhered onto the curved surface 1080 of the space 108 under the drive of an electric field applied between the first transparent electrode 103 and the second transparent electrode 104 when the transmission mode switching layer 110 is operated in the second transmission mode. The plurality of transparent particles 107 are adhered onto the flat surface 1082 of the space 108 under the drive of another electric field applied between the first transparent electrode 103 and the second transparent electrode 104 when the transmission mode switching layer 110 is operated in the first transmission mode. The direction of the electric field in the first transmission mode is opposite to that in the second transmission mode.

Figure 3A:
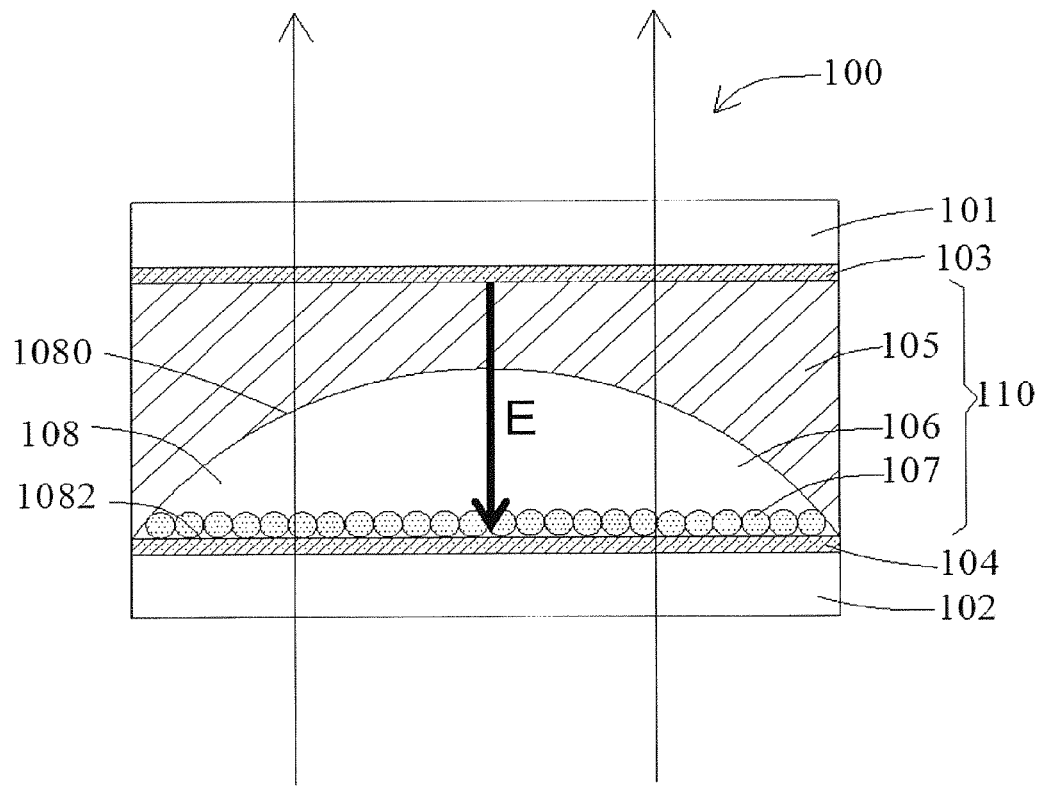
FIG. 3a is a partially sectional view of the transmission mode switching device shown in FIG. 2 in a first transmission mode.

FIG. 3a discloses a partially sectional view of the transmission mode switching device 100 according to the first embodiment of the present invention in the first transmission mode. As shown in FIG. 3a, it is assumed that in this embodiment the plurality of transparent particles 107 are all positively charged. When the voltage applied on the first transparent electrode 103 is larger than the voltage applied on the second transparent electrode 104, for example, when a positive voltage is applied on the first transparent electrode 103 and a negative voltage is applied on the second transparent electrode 104, an electric field-E is formed between the first transparent electrode 103 and the second transparent electrode 104, with the direction of electric field vertical down, and at this time, the positively charged transparent particles 107 move downward vertically along the direction of electric field under the action of the electric field and adhere onto the flat surface 1082 of the space 108, and the transmission mode switching device 100 is operated in the first transmission mode. Preferably, the transparent particles 107 are evenly spread on the entire flat surface 1082 of the space 108 and form a flat layer. In this case, the light emitted from the display device passes through the second substrate 102 and the second transparent electrode 104 and keeps its original direction of propagation, and later passes through the flat layer composed of the transparent particles 107. As the transparent particles 107 forming the flat layer essentially have optical properties of plano lens, the light passing through the transparent particles 107 of the flat layer still remains its original direction of propagation, and then the light further passes through the isotropic fluid medium 106 and into the isotropic solid medium layer 105. As the refractive index $n_2$ of the fluid medium 106 is the same as the refractive index $n_1$ of the solid medium layer 105, there is no refraction on the interface of those two, and the light still follows its original direction of propagation, and later passes through the first transparent electrode 103 and the first substrate 101. The light always keeps it original direction of propagation throughout the propagation via the transmission mode switching device 100, without refraction. The light emitted from any point on the display device can enter the right and left eyes of the viewer which can see the same image exhibited on the display device, and therefore, in this case, the display apparatus of the present invention exhibits 2D display mode.

Figure 3B:
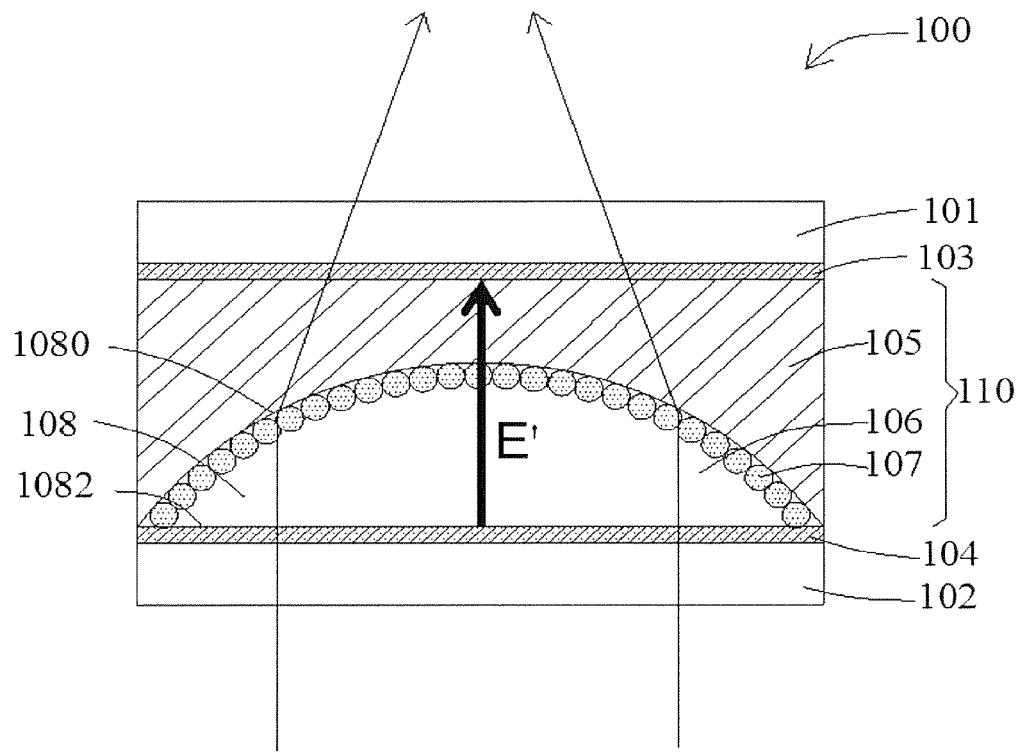
FIG. 3b is a partially sectional view of the transmission mode switching device shown in FIG. 2 in a second transmission mode.

FIG. 3b discloses a partially sectional view of the transmission mode switching device 100 according to the first embodiment of the present invention in the second transmission mode. As shown in FIG. 3b, when the voltage applied on the first transparent electrode 103 is less than the voltage applied on the second transparent electrode 104, for example, when a negative voltage is applied on the first transparent electrode 103 and a positive voltage is applied on the second transparent electrode 104, another electric field is formed between the first transparent electrode 103 and the second transparent electrode 104, with the direction of electric field vertical up, and at this time, the positively charged transparent particles 107 move upward vertically along the direction of electric field under the action of the electric field E' and adhere onto the curved surface 1080 of the space 108 so as to form a convex layer, and the transmission mode switching device 100 is operated in the second transmission mode. In this case, the light emitted from the display device passes through the second substrate 102 and the second transparent electrode 104, and keeps its original direction of propagation, and later passes through the isotropic fluid medium 106 and still follows its original direction of propagation, and further into the convex layer composed of the plurality of transparent particles 107, and then into the solid medium layer 105. As the refractive index $n_1$ of the solid medium layer 105 is equal to the refractive index $n_2$ of the fluid medium 106, which are both less than the refractive index $n_3$ of the transparent particles 107, and at this time, the convex layer composed of the plurality of transparent particles 107 essentially has optical properties of condenser lens. Therefore the light passing through the convex layer composed of the plurality of transparent particles 107 and will be refracted and propagate along the different propagation directions because of convergence, and later pass through the first transparent electrode 103 and the first substrate 101. The light will be refracted to alter its original direction of propagation during the propagation via the transmission mode switching device 100. The light emitted from different pixels in the display device passes through the transmission mode switching device 100 and selectively enters the right and left eyes of the viewer respectively. Images entering the right and left eyes of the viewer are also two images with optical parallax since the images that the different pixels in the display device show two images with optical parallax, and are merged by the brain to form a stereoscopic vision, and therefore in this case, the display apparatus of the present invention exhibits 3D display mode.

The above mentioned is exemplified by the plurality of transparent particles 107 positively charged to explain the principle of operation for the transmission mode switching device 100 of the present invention. However, the transparent particles 107 of the present invention are not limited to be positively charged, but also may be negatively charged. In the case of negatively charged transparent particles 107, correspondingly, in order to realize 2D and 3D display modes of the display apparatus, it is only needed to adjust the direction of electric field applied between the first transparent electrode 103 and the second transparent electrode 104, which also achieves the purpose of switching of the transmission mode switching device 100 between the first transmission mode and the second transmission mode.

The transmission mode switching device 100 of the present invention has the first transparent electrode 103 and the second transparent electrode 104 respectively provided on the first substrate 101 and the second substrate 102, and the transmission mode switching layer 110 having isotropic optical properties and formed between the first substrate 101 and the second substrate 102, and the transmission mode switching layer 110 can be switched between the first transmission mode in which the direction of light propagation is not altered and the second transmission mode in which the direction of light propagation is altered, in response to switching of the electric field applied between the first transparent electrode 103 and the second transparent electrode 104, and therefore can be applied in switching of 2D and 3D display modes. The transmission mode switching device 100 of the present invention can substitute the conventional liquid crystal lens, to replace the liquid crystal layer having anisotropic properties with the transmission mode switching layer 110 having isotropic optical properties. Therefore, relative to the conventional liquid crystal lens, as not limited by polarized light, the transmission mode switching device 100 of the present invention is compatible with multiple display modes such as liquid crystal display, cathode ray tube display, plasma display and organic light emitting diode display, etc.; meanwhile, the transmission mode switching layer 110 of the present invention does not employ liquid crystal material, and need no alignment layer, therefore, the transmission mode switching device 100 of the present invention avoids the liquid crystal from being affected by anchoring force and has relatively low driving voltage. Moreover, the transmission mode switching layer 110 in the transmission mode switching device 100 of the present invention is formed using the materials having isotropic optical properties, and therefore there are no limitation of viewing angle i.e., visual angle on the transmission mode switching device 100 of the present invention.

In addition, the transmission mode switching device 100 of the present invention employs charged transparent particles 107, and therefore by means of the electrophoresis of charged transparent particles 107, without the need of applying voltage between the first transparent electrode 103 and the second transparent electrode 104 for maintaining the 2D or 3D display mode, the position and state of the charged transparent particles 107 are retained completely by the memory effect of electrophoresis, and therefore, the transmission mode switching device 100 of the present invention has much lower power consumption.

Second Embodiment

Figure 4:
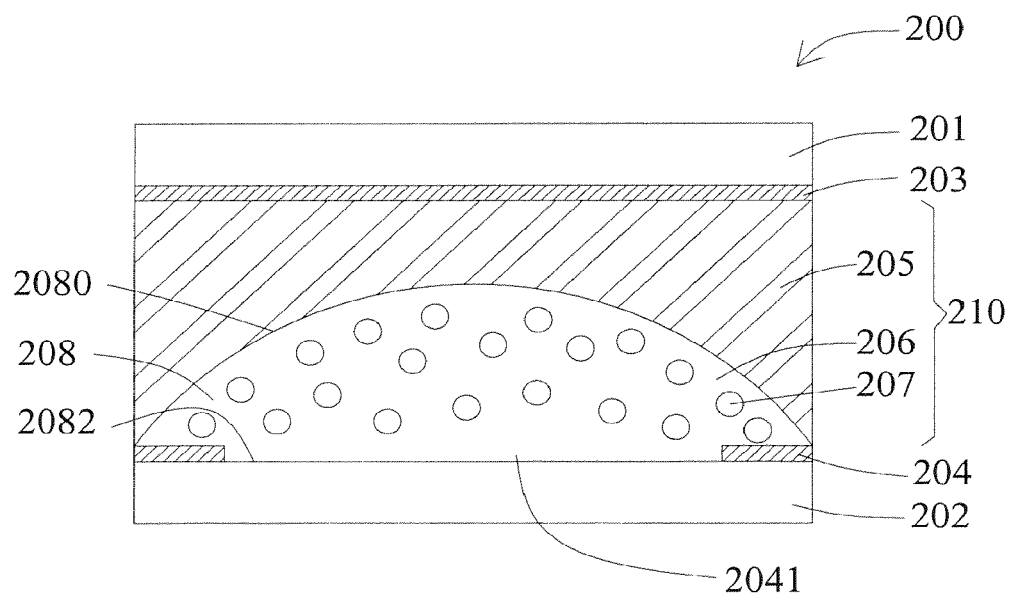
FIG. 4 is a partially sectional view of a transmission mode switching device according to a second embodiment of the present invention.

FIG. 4 discloses a partially sectional view of the transmission mode switching device 200 according to the second embodiment of the present invention. What is common between the transmission mode switching device 200 of the second embodiment and that of the first embodiment will not be described any more herein, and the differences therebetween lie in that: in the transmission mode switching device 200 of the second embodiment, in the first transparent electrode 203 and the second transparent electrode 204 corresponding to generate the electric field to each space 208, the transparent electrode adjacent to the curved surface 2080 of the space 208 (e.g., the first transparent electrode 203 located on the first substrate 201 in this embodiment) is continuously provided as a whole sheet, and the transparent electrode adjacent to the flat surface 2082 of the space 208 (e.g., the second transparent electrode 204 located on the second substrate 202 in this embodiment) is not continuously provided as a whole sheet but only provided adjacent to edges of each space 208. That is to say, the second transparent electrode 204 right below the elongated space 208 is provided with a strip-like gap 2041, and if the transmission mode switching device 200 in this embodiment is applied in the liquid crystal display device, preferably, the position where the second transparent electrode 204 is provided is corresponded to the position of black matrix among the pixels in the liquid crystal display device, so as to enhance its transmittance.

Figure 5A:
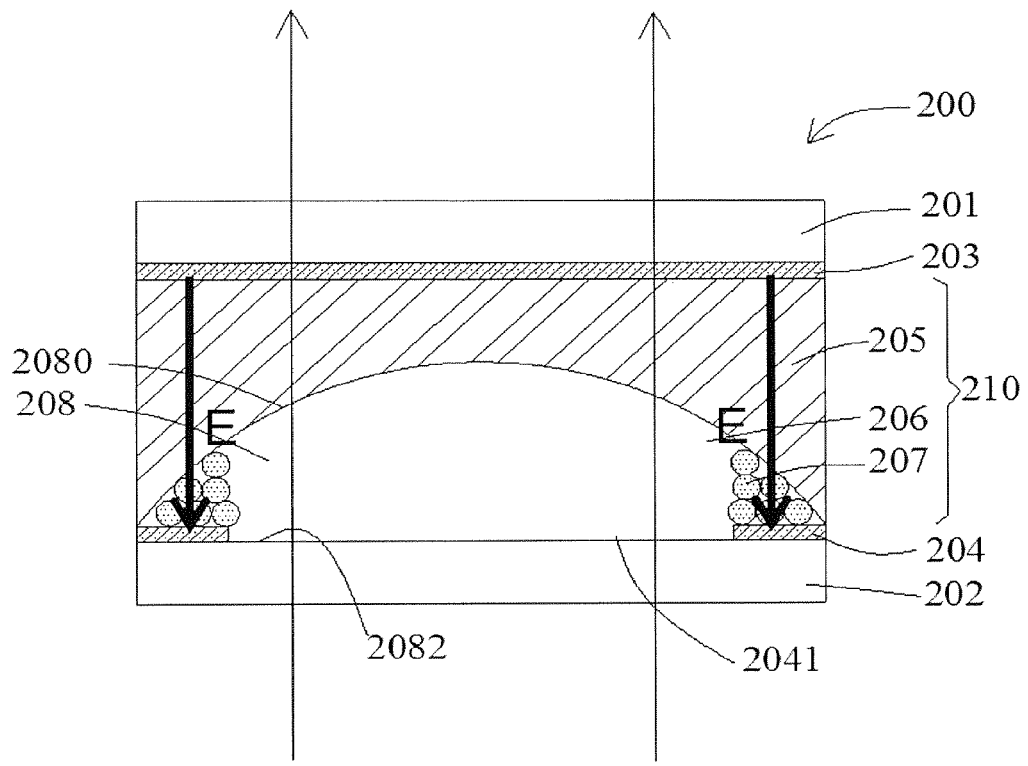
FIG. 5a is a partially sectional view of the transmission mode switching device shown in FIG. 4 in a first transmission mode.

As shown in FIG. 5a, it is also assumed that the plurality of transparent particles 207 are all positively charged. When the voltage applied on the first transparent electrode 203 is larger than that applied on the second transparent electrode 204, an electric field E is formed between the first transparent electrode 203 and the second transparent electrode 204, with the direction of electric field line vertical down, and at this time, the positively charged transparent particles 207 move downward vertically along the direction of electric field under the action of the electric field, and since the second transparent electrode 204 is only provided adjacent to the edges of each space 208, the transparent particles 207 only adhere on the flat surface 2082 of the space 208 corresponding to the second transparent electrode 204. Since the transparent particles 207 are only collectively located at two side edges of the flat surface 2082, and there are no transparent particles 207 in most regions of the center of the flat surface 2082, in this case, it is not required for the light incident into the transmission mode switching layer 210 to pass through the transparent particles 207 but directly through the isotropic fluid medium 206 and into isotropic solid medium layer 205, and the transmission mode switching layer 210 is operated in the first transmission mode, the light will not be refracted throughout the propagation via the transmission mode switching device 200 and always keeps its original direction of propagation, therefore realizing 2D display mode. When used for 2D display mode, since the incident light does not need to pass through the transparent particles 207 when it passes through the transmission mode switching layer 210, compared to the first embodiment, the transmission mode switching device 200 of the second embodiment can reduce the reflection to the incident light caused by the layer composed of transparent particles 207, and increase the transmittance of incident light, thus increasing utilization of light in 2D display mode and increasing the image brightness in 2D display.

Figure 5B:
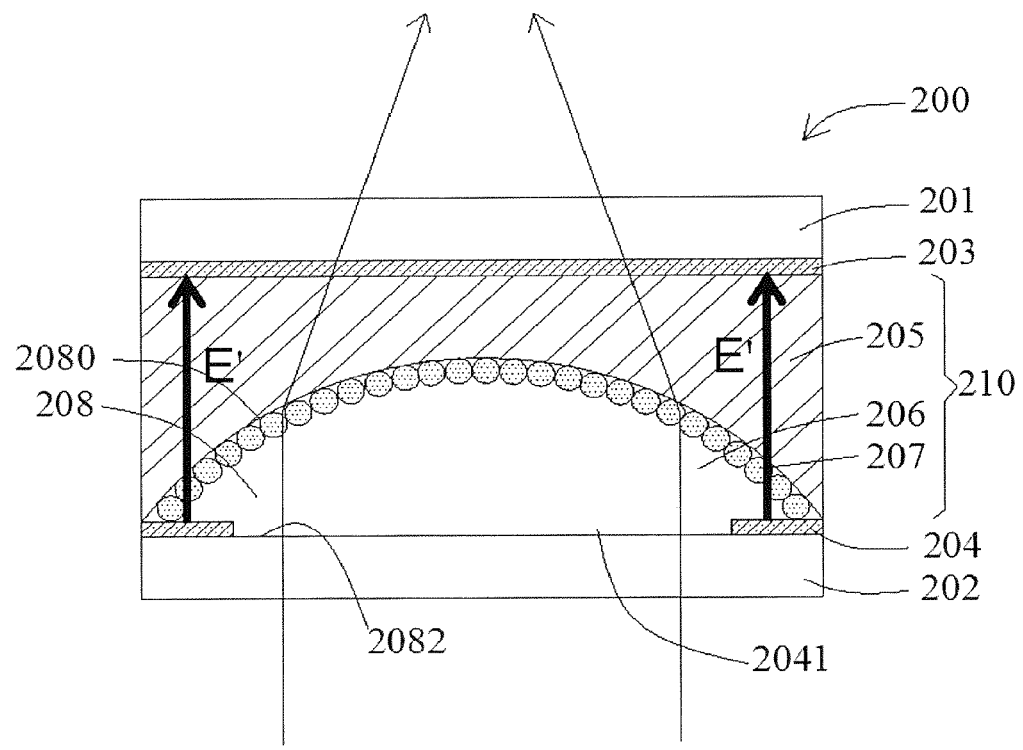
FIG. 5b is a partially sectional view of the transmission mode switching device shown in FIG. 4 in a second transmission mode.

As shown in FIG. 5b, when the electric field E' applied between the first transparent electrode 203 and the second transparent electrode 204 is reversed, and at this time, the direction of electric field is vertical up, and the positively charged transparent particles 207 move upward vertically along the direction of electric field under the action of the electric field and adhere onto the curved surface 2080 of the space 208 so as to form a convex layer, and the transmission mode switching layer 210 is operated in the second transmission mode, the light will be refracted to alter its original direction of propagation during the propagation via the transmission mode switching device 200, therefore realizing 3D display mode. Its principle of operation is similar to FIG. 3b in the first embodiment, and therefore, will not be described any more herein.

Third Embodiment

Figure 6:
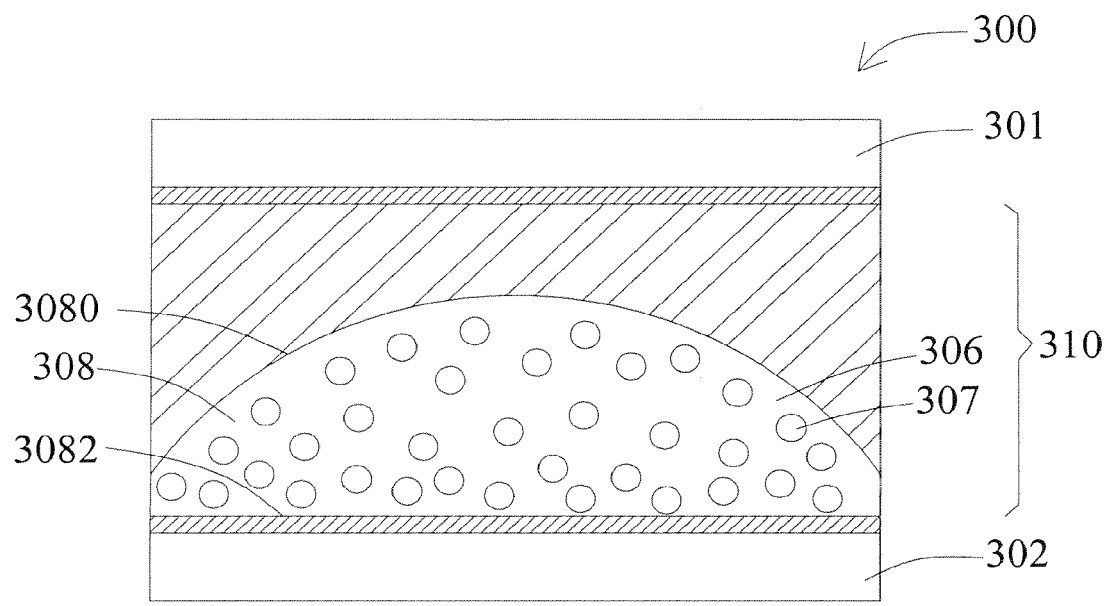
FIG. 6 is a partially sectional view of a transmission mode switching device according to a third embodiment of the present invention.

FIG. 6 discloses a partially sectional view of the transmission mode switching device 300 according to the third embodiment of the present invention. What is common between the transmission mode switching device 300 of the third embodiment and that of the first embodiment will not be described any more herein, and the differences therebetween lie in that: the curvature of the curved surface 3080 of the space 308 of the third embodiment is the same as that of the first embodiment, but the curved surface 3080 of each space 308 is not joined with but is spaced apart a certain distance from the flat surface 3082. Therefore, a larger amount of fluid medium 306 and transparent particles 307 dispersed in the fluid medium 306 can be accommodated within the space 308 of the third embodiment.

Figure 7A:
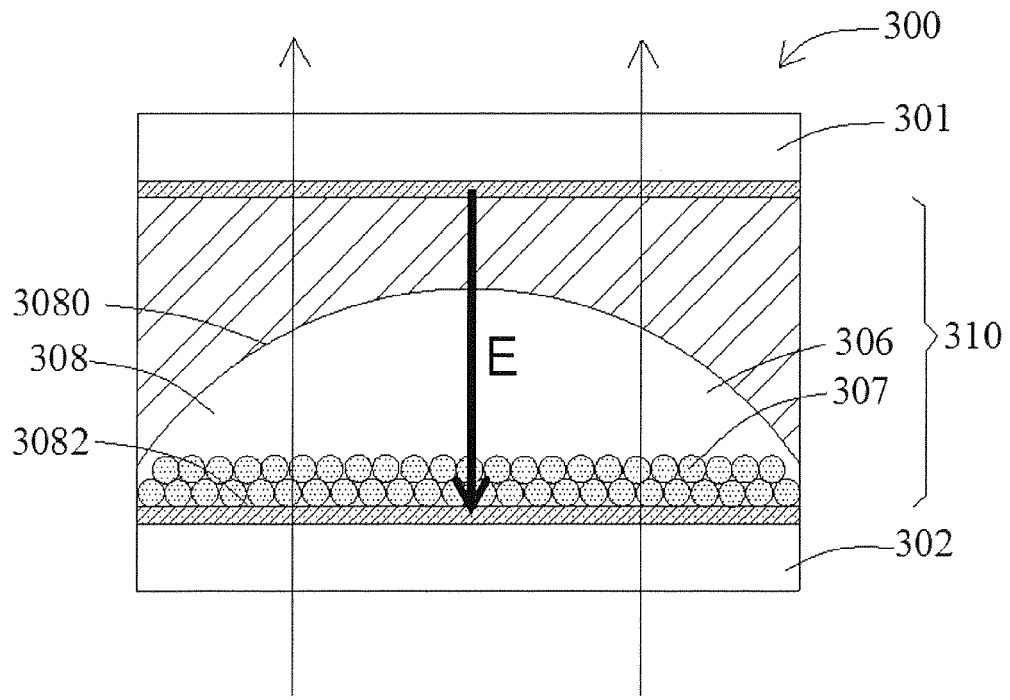
FIG. 7a is a partially sectional view of the transmission mode switching device shown in FIG. 6 in a first transmission mode.

FIG. 7a discloses a partially sectional view of the transmission mode switching device 300 according to the third embodiment of the present invention in the first transmission mode, which has a principle of operation similar to FIG. 3a of the first embodiment, and therefore, will not be described any more herein. Compared to the first embodiment, the space 308 of the third embodiment is much larger so that it can accommodate more fluid medium 306 and transparent particles 307, and therefore, the light needs to pass through the much thicker flat layer composed of transparent particles 307.

Figure 7B:
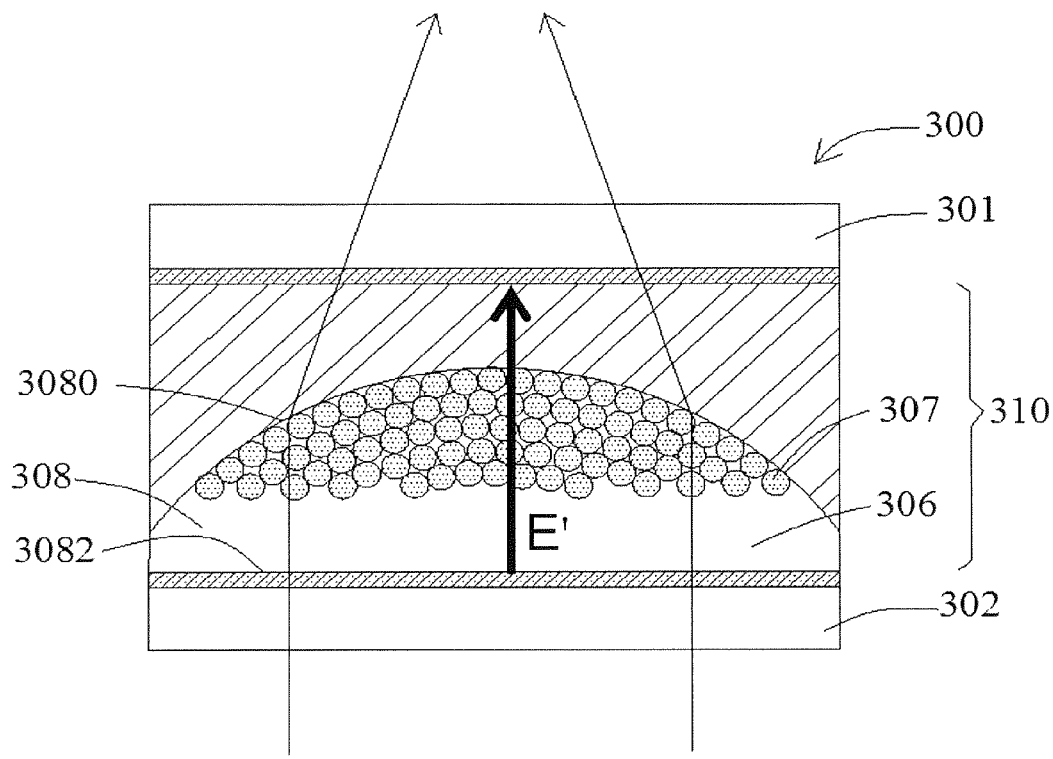
FIG. 7b is a partially sectional view of the transmission mode switching device shown in FIG. 6 in a second transmission mode.

FIG. 7b discloses a partially sectional view of the transmission mode switching device 300 according to the third embodiment of the present invention in the second transmission mode, which has a principle of operation similar to FIG. 3b of the first embodiment, and therefore, will not be described any more herein. Compared to the first embodiment, the space 308 of the third embodiment is much larger so that it can accommodate more fluid medium 306 and transparent particles 307, and therefore, it can be avoided that the transparent particles 307 only collectively adhere to the central region of the curved surface 3080 and the convex layer composed of transparent particles 307 becomes uneven as a result of adhesion of transparent particles 307.

The transmission mode switching device 300 of the third embodiment above is exemplified by improvement on the first embodiment. Certainly, such changes in structure of the space 308 of the third embodiment may also be applied to the second embodiment, which also belongs to equivalents of the transmission mode switching device 300 of the present invention without departing from the spirit of the present invention.

The transmission mode switching devices 100, 200, 300 of all the embodiments above mentioned are exemplified by the instance in which the curved surfaces 1080, 2080, 3080 of the plurality of spaces 108, 208, 308 are disposed adjacent to the viewer and the flat surfaces 1082, 2082, 3082 thereof are disposed far from the viewer. However, the present invention is not limited thereto, the curved surfaces 1080, 2080, 3080 of the plurality of spaces 108, 208, 308 of the transmission mode switching device 100, 200, 300 according to the present invention can also be provided far from the viewer and the flat surfaces 1082, 2082, 3082 thereof can be provided adjacent to the viewer, i.e., the curved surfaces 1080, 2080, 3080 of the plurality of spaces 108, 208, 308 are provided adjacent to the second substrate 102, 202, 302, while the flat surfaces 1082, 2082, 3082 are provided adjacent to the first substrate 101, 201, 301; or, even the curved surfaces 1080, 2080, 3080 of a portion of the plurality of the spaces 108, 208, 308 according to the present invention are provided adjacent to the viewer, and the curved surfaces 1080, 2080, 3080 of another portion of the spaces 108, 208, 308 are provided far from the viewer, i.e., the curved surfaces 1080, 2080, 3080 of a portion of the plurality of the spaces 108, 208, 308 are provided adjacent to the first substrate 101, 201, 301, and the flat surfaces 1082, 2082, 3082 thereof are provided adjacent to the second substrate 102, 202, 302, while the curved surfaces 1080, 2080, 3080 of another portion of the spaces 108, 208, 308 are provided adjacent to the second substrate 102, 202, 302, and the flat surfaces 1082, 2082, 3082 thereof are provided adjacent to the first substrate 101, 201, 301. The equivalents for configuration of the above spaces 108, 208, 308 can also realize the switching of the first transmission mode and the second transmission mode of the transmission mode switching device 100, 200, 300, and can also achieve the purposes of the present invention.

The curvature of the curved surface 1080, 2080, 3080 of the space 108, 208, 308 according to the present invention can be properly adjusted depending on various types of display devices and distances from the viewer to the display device.

Generally speaking, the transmission mode switching layer 110, 210, 310 of the transmission mode switching device 100, 200, 300 according to the present invention and the shape and configuration of its space 108, 208, 308 are not limited to the above, but actually, the structural designs are all encompassed within the scope of the present invention, as long as they satisfy that when used for 2D display, the light passing through the transmission mode switching layer 110, 210, 310 will not be refracted, and when used for 3D display, the light passing through the transmission mode switching layer 110, 210, 310 will be refracted.

The transmission mode switching device and the display apparatus provided by the present invention have been described above in detail, and specific examples are used herein to illustrate the principle and embodiments of the present invention, which are only used to help understand the methodology and concept of the present invention; meanwhile, as for the one skilled in the art, changes can be made to the embodiments and application scope in accordance with the concept of the present invention. In view of the foregoing, the contents of the specification should not be interpreted as limitations to the scope of the present invention which should be referred to the appended claims.

What is claimed is:

1. A transmission mode switching device, comprising:
   a first substrate, on which a first transparent electrode is configured;
   a second substrate, on which a second transparent electrode is configured; and
   a transmission mode switching layer, which is located between the first substrate and the second substrate and formed by materials with isotropic optical properties;
   wherein said transmission mode switching layer is switched between a first transmission mode and a second transmission mode in response to switching of the electric field applied between said first transparent electrode and said second transparent electrode, the light passes through said transmission mode switching layer and keeps its original direction of propagation when said transmission mode switching layer is operated in said first transmission mode; and the light passes through said transmission mode switching layer and alters its original direction of propagation when said transmission mode switching layer is operated in said second transmission mode.

2. The transmission mode switching device as set forth in claim 1, wherein said transmission mode switching layer essentially has optical properties of plano lens in said first transmission mode; and said transmission mode switching layer essentially has optical properties of condenser lens in said second transmission mode.

3. The transmission mode switching device as set forth in claim 2, wherein said transmission mode switching layer comprises:
   a solid medium layer, which is located between said first substrate and said second substrate, wherein a plurality of spaces are provided on said solid medium layer, each said space having a curved surface;
   a fluid medium, which is filled in said plurality of spaces; and
   a plurality of transparent particles, which are located within said fluid medium in said plurality of spaces and movable;
   wherein said plurality of transparent particles are adhered onto said curved surface of said space under the drive of electric field when said transmission mode switching layer is operated in said second transmission mode.

4. The transmission mode switching device as set forth in claim 3, wherein each said space further has a flat surface, and said plurality of transparent particles are adhered onto said flat surface of said space under the drive of electric field when said transmission mode switching layer is operated in said first transmission mode.

5. The transmission mode switching device as set forth in claim 4, wherein the direction of the electric field in said first transmission mode is opposite to that in said second transmission mode.

6. The transmission mode switching device as set forth in claim 4, wherein said solid medium layer, said fluid medium and said transparent particles all have isotropic optical properties, the refractive index of said solid medium layer is essentially equal to that of said fluid medium, and the refractive index of said solid medium layer is less than that of said transparent particles.

7. The transmission mode switching device as set forth in claim 4, wherein said curved surface of each said space is configured opposed to said flat surface.

8. The transmission mode switching device as set forth in claim 7, wherein said first transparent electrode and said second transparent electrode corresponding to generate the electric field to each of said spaces are both continuously provided as a whole sheet.

9. The transmission mode switching device as set forth in claim 7, wherein in said first transparent electrode and said second transparent electrode corresponding to generate the electric field to each of said spaces, the transparent electrode adjacent to the curved surface of said space is continuously provided as a whole sheet, while the transparent electrode adjacent to the flat surface of said space is only provided adjacent to edges of each of said spaces.

10. The transmission mode switching device as set forth in claim 7, wherein said curved surfaces of said plurality of spaces are provided adjacent to said first substrate; or
    said curved surfaces of said plurality of spaces are provided adjacent to said second substrate; or
    said curved surfaces of a portion of said plurality of spaces are provided adjacent to said first substrate, and said curved surfaces of another portion of said plurality of spaces are provided adjacent to said second substrate.

11. The transmission mode switching device as set forth in claim 7, wherein said curved surface of each said space is joined with or spaced apart a certain distance from said flat surface.

12. The transmission mode switching device as set forth in claim 7, wherein said plurality of spaces are all elongated, said curved surface being an internal cylindrical surface, and the axes of the internal cylindrical surfaces of said plurality of spaces being parallel to each other.

13. The transmission mode switching device as set forth in claim 3, wherein said solid medium layer and said fluid medium are both dielectric substance, and said transparent particles are charged particles.

14. A 2D/3D switchable display apparatus used for presenting 2D and 3D display modes to predetermined viewers, comprising a display device and the transmission mode switching device as set forth in claim 1, wherein said transmission mode switching device is located between said display device and said predetermined viewers, and wherein the transmission mode switching layer is operated in said first transmission mode when said display apparatus presents a 2D display mode; and said transmission mode switching layer is operated in said second transmission mode when said display apparatus presents a 3D display mode.

15. The 2D/3D switchable display apparatus as set forth in claim 14, wherein said display device is any of liquid crystal display device, cathode ray tube display device, plasma display device and organic light emitting diode display device.

16. The 2D/3D switchable display apparatus as set forth in claim 14, wherein said transmission mode switching layer essentially has optical properties of plano lens in said first transmission mode; and said transmission mode switching layer essentially has optical properties of condenser lens in said second transmission mode.

17. The 2D/3D switchable display apparatus as set forth in claim 16, wherein said transmission mode switching layer comprises:
    a solid medium layer, which is located between said first substrate and said second substrate, wherein a plurality of spaces are provided on said solid medium layer, each said space having a curved surface;
    a fluid medium, which is filled in said plurality of spaces; and
    a plurality of transparent particles, which are located within said fluid medium in said plurality of spaces and movable;
    wherein said plurality of transparent particles are adhered onto said curved surface of said space under the drive of electric field when said transmission mode switching layer is operated in said second transmission mode.

18. The 2D/3D switchable display apparatus as set forth in claim 17, wherein each said space further has a flat surface, and said plurality of transparent particles are adhered onto said flat surface of said spaces under the drive of electric field when said transmission mode switching layer is operated in said first transmission mode.

19. The 2D/3D switchable display apparatus as set forth in claim 17, wherein said solid medium layer and said fluid medium are both dielectric substance, and said transparent particles are charged particles.

* * * * *